Jan. 19, 1937.  W. L. MORRISON  2,068,505
VEHICLE BODY
Filed Sept. 28, 1933  6 Sheets—Sheet 1

Inventor:
Willard L. Morrison,
By Parker & Carter
Attys.

Jan. 19, 1937.  W. L. MORRISON  2,068,505
VEHICLE BODY
Filed Sept. 28, 1933   6 Sheets—Sheet 2
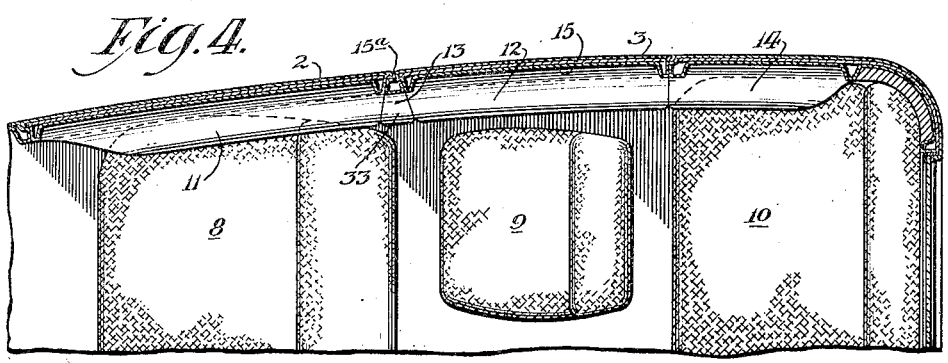
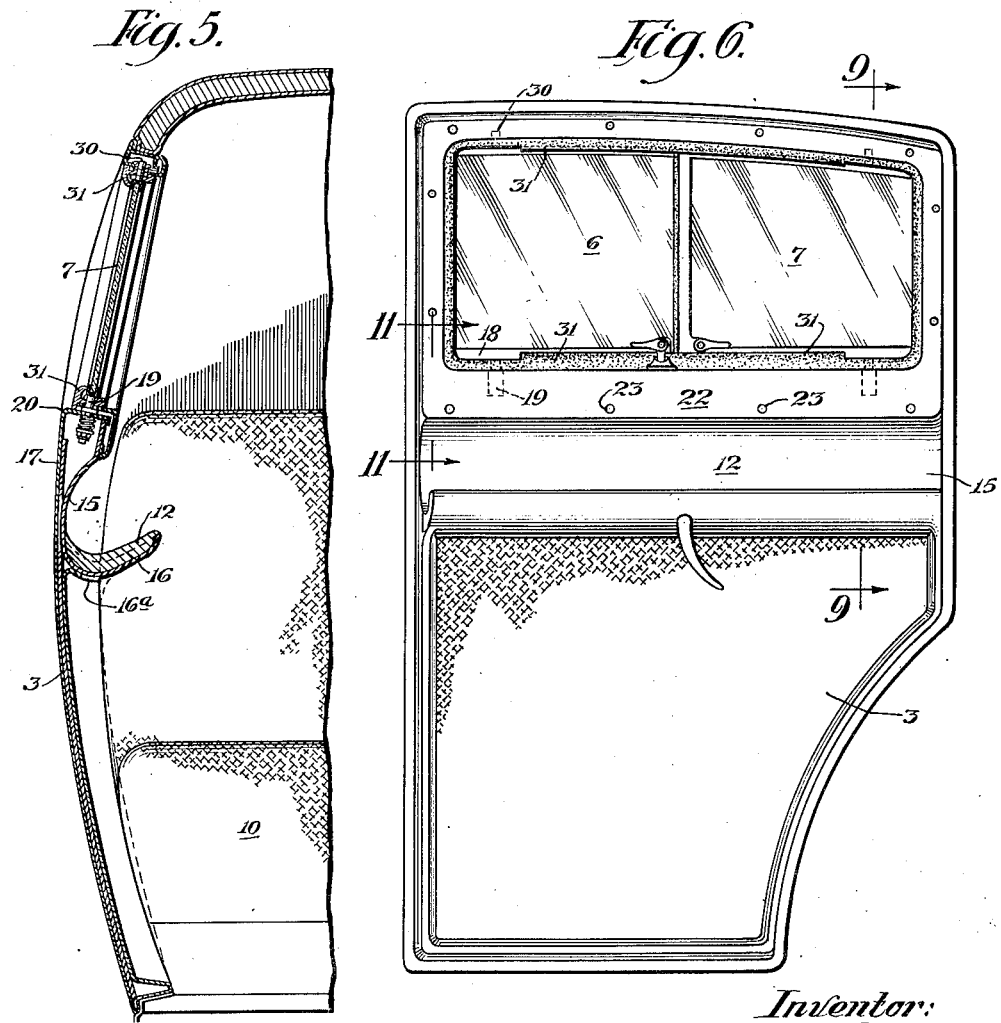

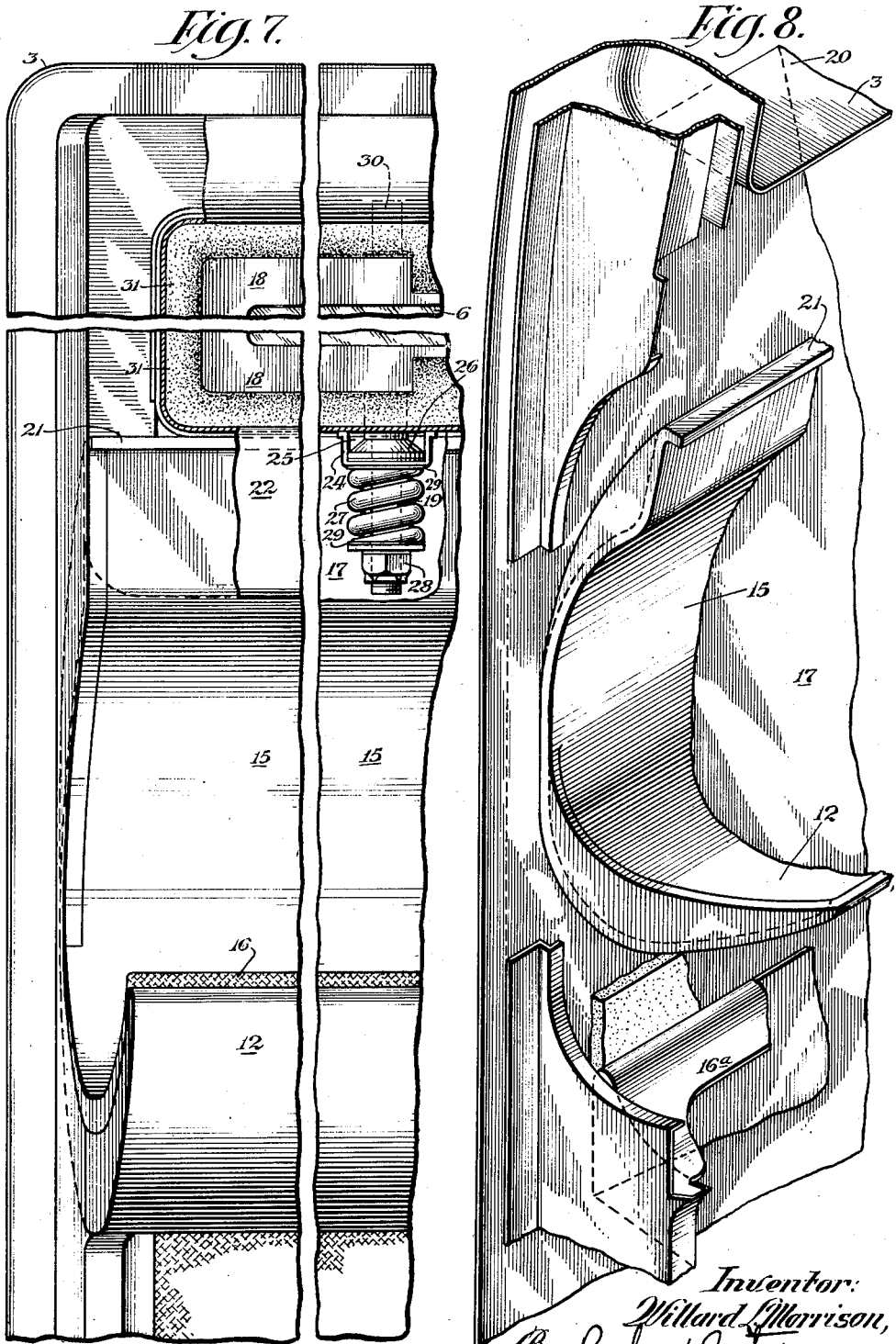

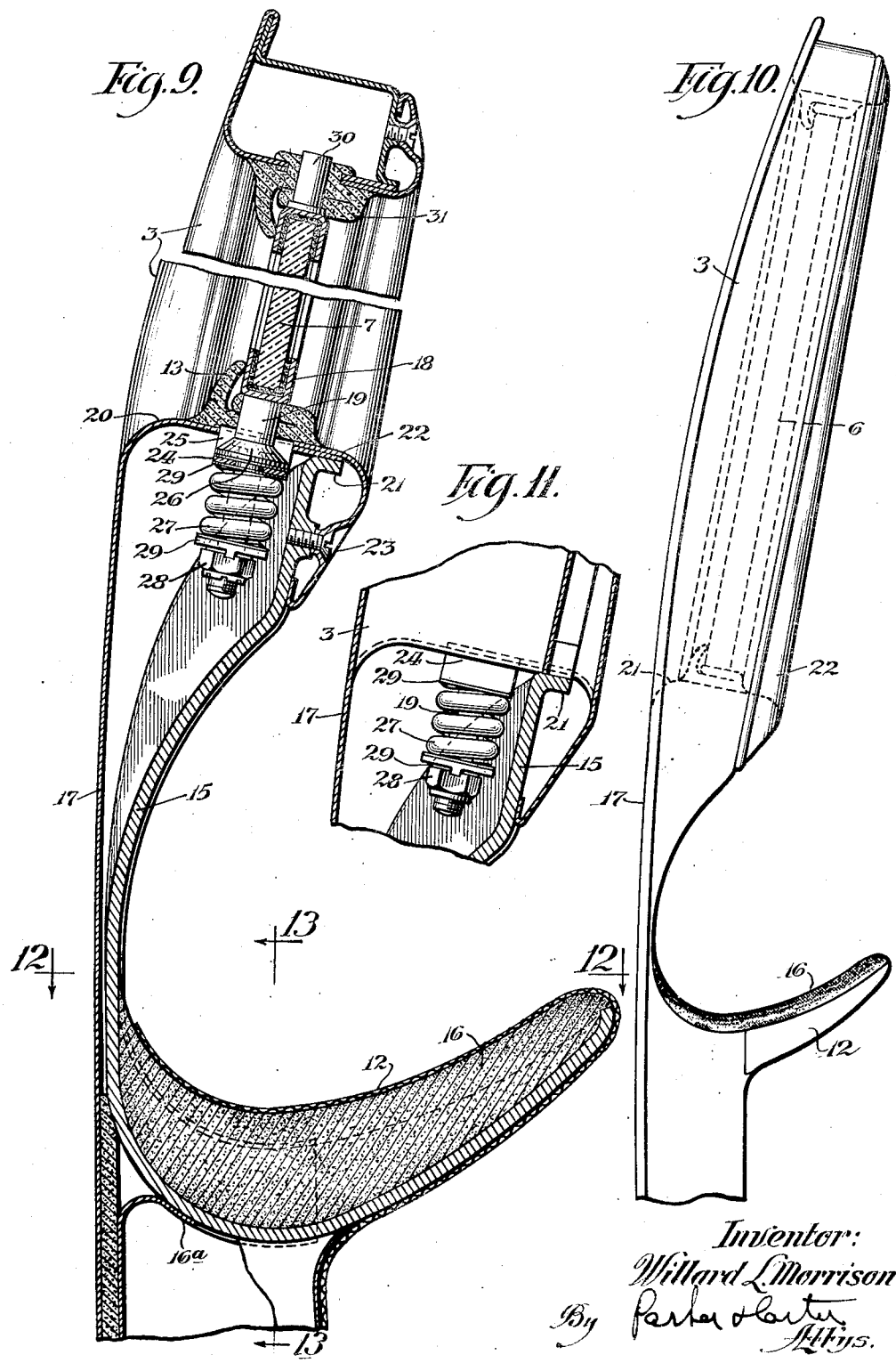

Jan. 19, 1937.  W. L. MORRISON  2,068,505
VEHICLE BODY
Filed Sept. 28, 1933  6 Sheets-Sheet 5
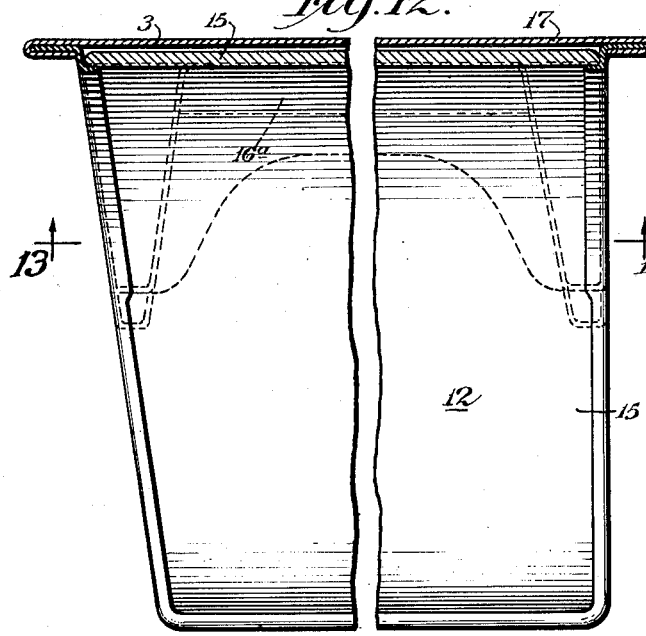
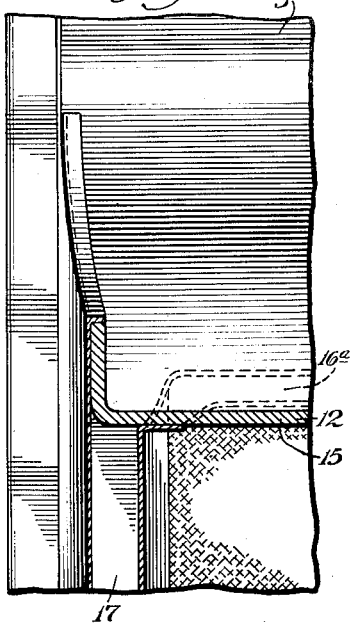
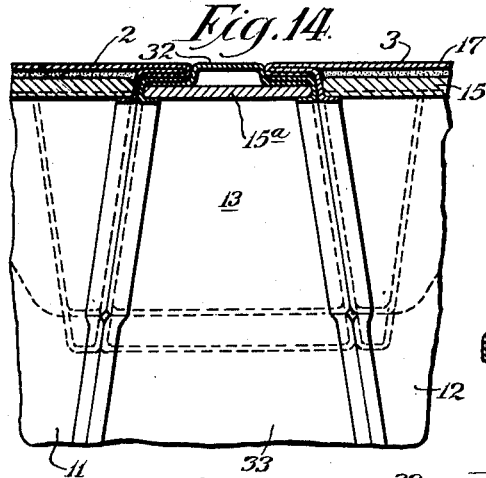
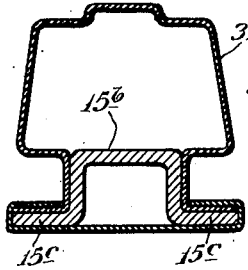
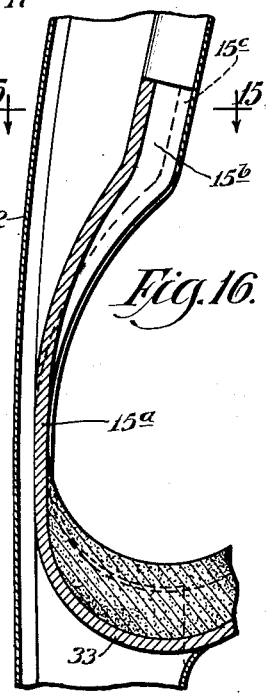
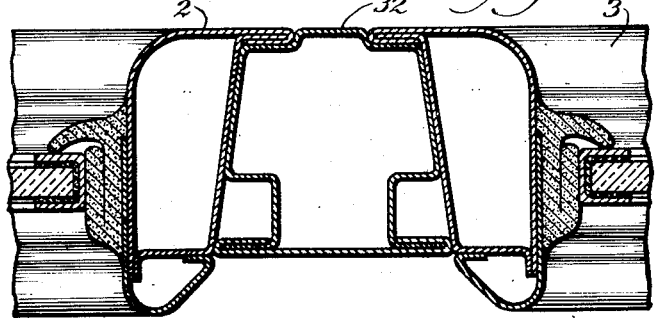
Inventor:
Willard L. Morrison,
By Parker & Carter
Attys.

Jan. 19, 1937. W. L. MORRISON 2,068,505
VEHICLE BODY
Filed Sept. 28, 1933 6 Sheets-Sheet 6
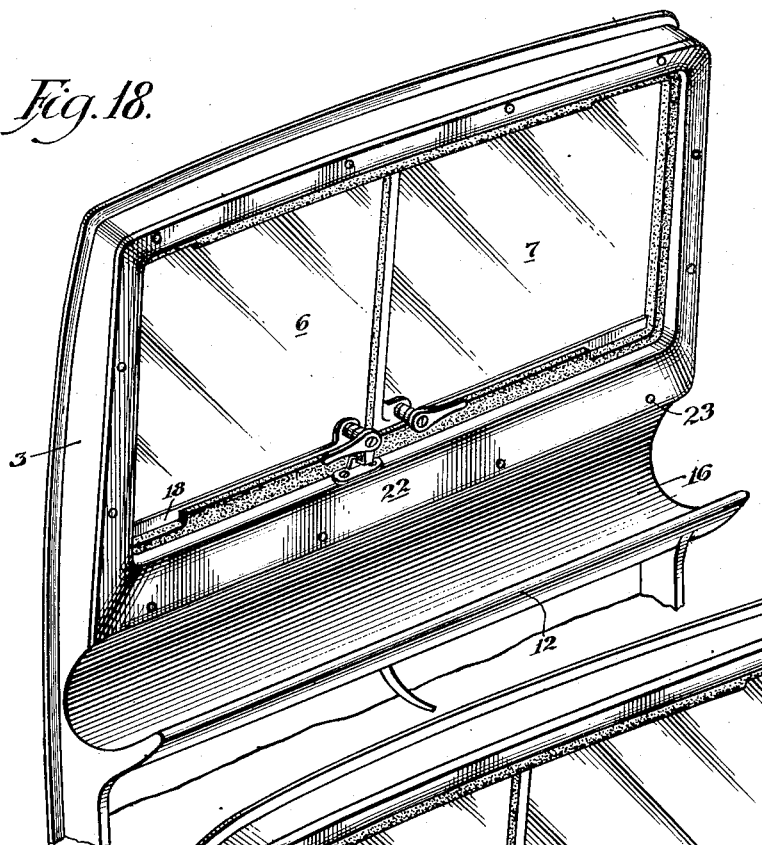
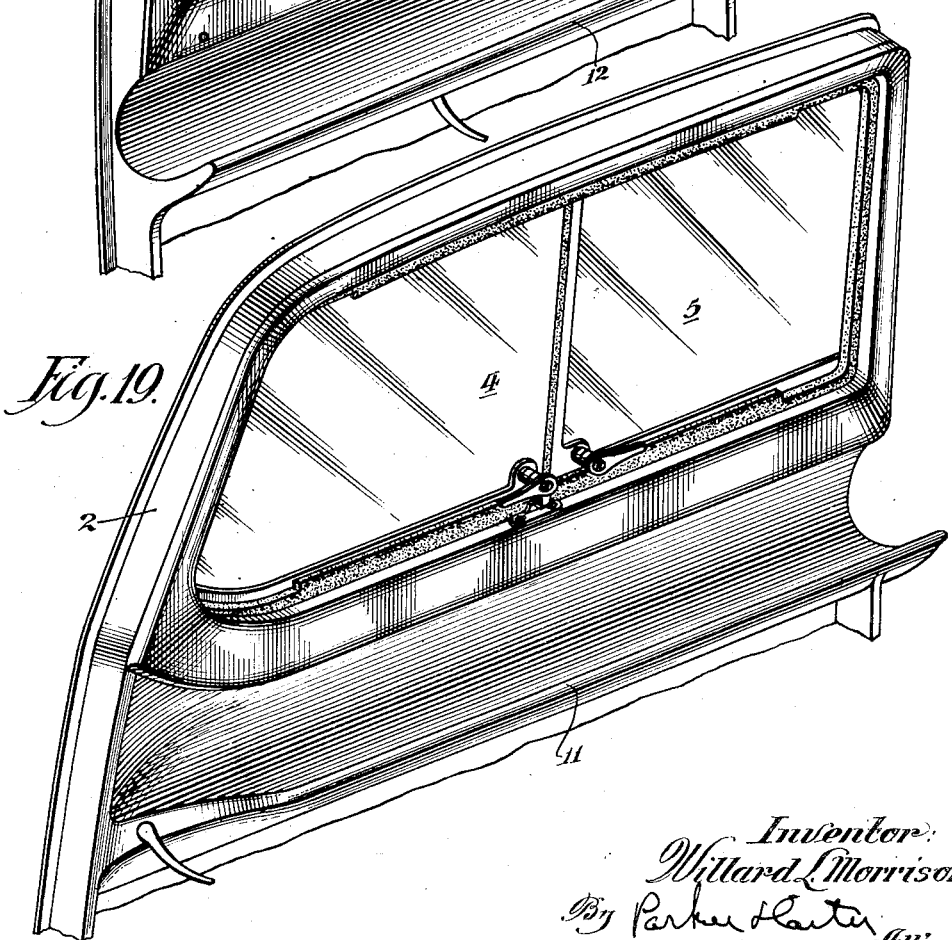

Patented Jan. 19, 1937

2,068,505

UNITED STATES PATENT OFFICE 2,068,505

VEHICLE BODY

Willard L. Morrison, Lake Forest, Ill.

Application September 28, 1933, Serial No. 691,268

7 Claims. (Cl. 296—44)

This invention relates to vehicle bodies and has for its object to provide a new and improved body of this description. The invention has as a further object to provide a vehicle body having an arm rest which extends past the door posts. The invention has as a further object to provide a vehicle body with an arm rest extending from the front to the rear in position for use by occupants on all of the seats. The invention has other objects which are more particularly pointed out in the accompanying description.

Referring now to the drawings, Fig. 1 shows a vehicle with a body provided with one form of the invention;

Fig. 4 is a sectional view taken on line 4—4 of Fig. 2;

Fig. 5 is an enlarged sectional view taken on line 5—5 of Fig. 2;

Fig. 6 is a view showing the inside of the rear door;

Fig. 7 is an enlarged view with parts broken away of the front portion of the door shown in Fig. 6;

Fig. 8 is a perspective view with parts omitted showing one of the door pillows;

Fig. 9 is an enlarged sectional view taken on line 9—9 of Fig. 6;

Fig. 10 is a view showing one edge of one of the doors;

Fig. 11 is an enlarged sectional view taken on line 11—11 of Fig. 6;

Fig. 12 is a sectional view taken on line 12—12 of Fig. 9;

Fig. 13 is a sectional view taken on line 13—13 of Figs. 9 and 12;

Fig. 14 is an enlarged sectional view taken on line 14—14 of Fig. 3;

Fig. 15 is an enlarged sectional view taken on line 15—15 of Fig. 16;

Fig. 16 is a sectional view taken on line 16—16 of Fig. 3;

Fig. 17 is an enlarged sectional view taken on line 17—17 of Fig. 3;

Fig. 18 is a perspective view of the upper end of the rear door;

Fig. 19 is a perspective view of the upper end of the front door.

Like numerals refer to like parts throughout the several figures.

Figure 1:
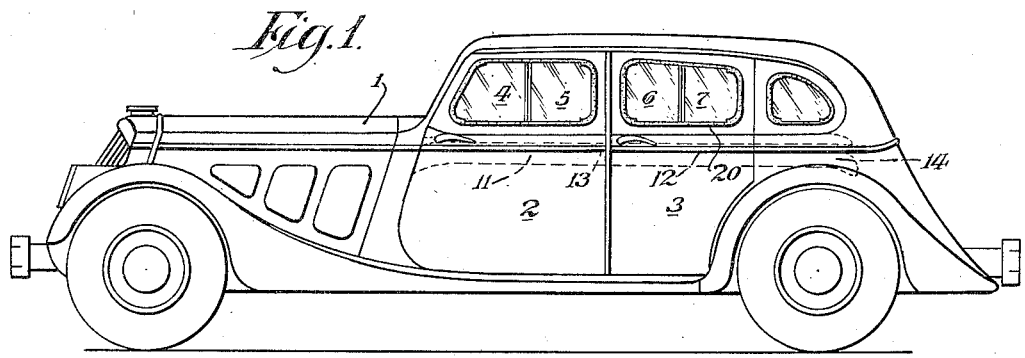
Figure 2:
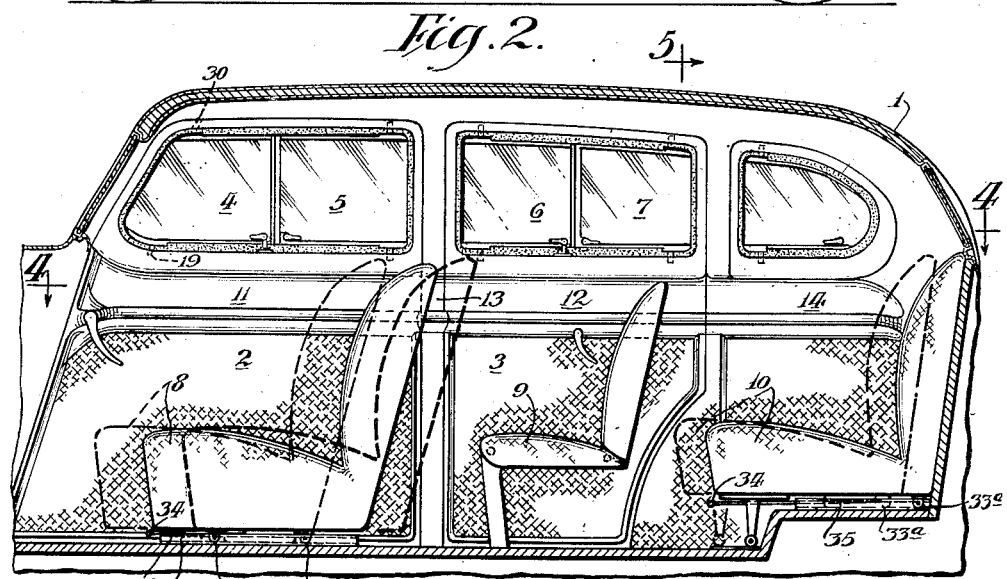
Fig. 2 is an enlarged vertical sectional view through the body.
Figure 3:
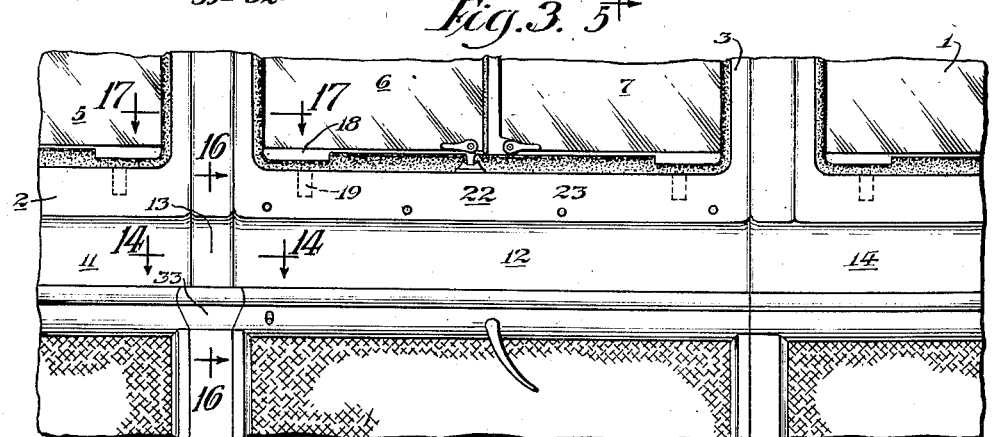
Fig. 3 is an enlarged view of the central portion of Fig. 2.

In the drawings there is shown a vehicle 1, which in this instance is an automobile. This vehicle is provided with the doors 2 and 3. All of the doors are provided with windows. In the particular construction shown the front door has the two pivoted windows 4 and 5 and the rear door the two pivoted windows 6 and 7. The invention is particularly adapted for vehicles having a plurality of seats. In the construction shown there is illustrated three seats 8, 9 and 10. On each side of the automobile opposite these seats is an arm rest which extends past all of them, as clearly shown in Fig. 2. The arm rest is preferably formed, not only on the doors of the automobile, but on the door posts or sections between the doors, so as to be continuous, thus permitting the arm of the occupant of any of the seats to always have a position on the arm rest, the door posts or sections between the doors in no manner interfering with this. This arm rest is made in sections, each door having a section, and the body having sections which join up with the door sections when the doors are closed. The front door has the arm rest section 11, the rear door has the arm rest section 12, and the door post or portion of the body between the two doors has the arm rest section 13. The body back of the door 3 has the arm rest section 14. The arm rests may be formed in any desired manner and are located below the window in a proper position to conveniently and comfortably receive the arms of the occupants. As shown in Figs. 5 and 9, for example, the arm rest is illustrated as made up of a bent member 15, preferably of metal, which is bent around in the proper shape and which has on the interior some suitable cushioning member 16, the parts being covered with the cloth or other finish used on the interior of the vehicle. The bent member 15 is of proper thickness and form to provide a strengthening member for the structure. It is also supported at the bottom by the supporting member 16a attached to the wall of the vehicle. It will be noted that the member 15 approaches the outer wall 17 and that the arm supporting portion thereof projects under the window. The window is provided with a frame member 18 to which is attached a pivot 19 which projects through the reveal 20. The side wall 17 is bent over to form the reveal, the end of which rests on the top of the member 15, which is preferably bent over at 21. The inside part 22 of the reveal overlaps the part 20, as shown in Fig. 9, and is attached to the member 15 by the fastening device 23. Associated with the reveal is a member 24 through which the pivot passes, the member having the enlarged opening with the beveled face 25 against which is pressed the part 26 on the pivot, having a corresponding beveled face. A spring 27 on the pivot is interposed between the part 26 and a nut 28. There are friction washers 29 so that when the nut is tightened up, friction resisting the pivotal movement of the window is produced. There is an upper pivot 30. There is also a sealing device 31 extending around the window. The pivot and spring are located between the outer wall 17 and the member 15. The section 13 of the arm rest which is on the door post or member between the two doors, is formed of a curved member 15a similar to that on the door. This member 15a forms a strengthening member for the door post, and above the arm engaging point is preferably formed with a channel 15b and laterally projecting portions 15c, see Fig. 15. The metal 32 of the body is bent around the portions 15b and 15c of the member 15a, as shown in Fig. 15. At the point just above where the arm is received the metal 32 is bent around the member 15a, as shown in Fig. 14. The door post is provided with the outwardly projecting member 33 which engages the under part of the arm rest.

The arm rest is hollowed out and bent upwardly at its inner free edge so that it acts to hold the arm, acting not only as an arm rest but as a holding device to hold the occupant steady and against lateral movement. When the automobile is turning corners or going around curves, the arm rest acts as a reinforcing or strengthening device for the door, and also for the door post.

I have shown the front and rear seats as being movable. Any suitable means for this purpose may be used. As herein shown, the seats are provided with rollers 32a which work in guides 33a, the seats being held in any desired position by catches 34 which work in notches 35. By means of the arm rest extending along the body as shown, the occupants of any of the seats can place their arms thereon when leaning over and when sitting up straight, and when the seats are in any of their various positions, people in the back seat, for example, could not satisfactorily use an arm rest that did not extend through the back door post, as usually there is not room for a satisfactory arm rest back of the rear door post. This continuous arm rest is essential to the use of movable seats.

I claim:

1. A vehicle body comprising a body portion having doors and portions of the body adjacent the doors, a plurality of seats inside of the body portion, and an arm rest having portions on said doors and on the adjacent portions of the body which form a continuous arm rest when the doors are closed.

2. A vehicle body comprising a body portion having doors and portions of the body adjacent the doors, a plurality of seats inside of the body portion, and an arm rest having portions on said doors and on the adjacent portions of the body which form a continuous arm rest when the doors are closed, said arm rest having its inner edge bent upwardly so as to act as a holding device.

3. A vehicle body comprising a body portion having doors and portions of the body adjacent the doors, a plurality of seats inside of the body portion, and an arm rest having portions on said doors and on the adjacent portions of the body which form a continuous arm rest when the doors are closed, supporting members for said arm rest, said supporting members and arm rest acting as reinforcing strengthening devices for the parts to which they are connected.

4. A vehicle body comprising a body portion having doors and portions of the body adjacent the doors, a plurality of seats inside of the body portion, and movable longitudinally of the body portion, and an arm rest having portions on said doors and on the adjacent portions of the body which form a continuous arm rest when the doors are closed, always in proper position with relation to said movable seats in all their various positions.

5. A vehicle body having a door with a window opening therein, an arm rest connected with the inner side of said door, said arm rest having at its inner edge, an upstanding bracing part which engages the arm of the occupant of the car to act as a holding device to brace the occupant of the car against sidewise motion when the arm of the occupant is placed thereon.

6. A vehicle body having a door with a window opening therein, an arm rest connected with the inner side of said door, a bracing member connected with the door below said arm rest and engaging the arm rest and extending entirely across the door, the bracing member and arm rest forming a strengthening device for the door.

7. The combination in an automobile body, of movable seats, and an arm rest on the inside of the body which is in operative position with relation to said seats in all their various positions, said arm rest having its inner edge bent upwardly so as to form a hollow substantially the shape of the arm and into which the arm is received, said arm rest acting as a brace to prevent the arm from being displaced from the arm rest by lateral movement to act as a bracing device to brace the occupants of said seats against sidewise motion when their arms are thereon.

WILLARD L. MORRISON.